United States Patent [19]

Kielb

[11] Patent Number: 4,623,266

[45] Date of Patent: Nov. 18, 1986

[54] COLD JUNCTION COMPENSATION FOR THERMOCOUPLE

[75] Inventor: John A. Kielb, Eden Prairie, Minn.

[73] Assignee: Rosemount Inc., Eden Prairie, Minn.

[21] Appl. No.: 779,514

[22] Filed: Sep. 24, 1985

[51] Int. Cl.⁴ ............................................. G01K 7/12
[52] U.S. Cl. .................................... 374/181; 136/230
[58] Field of Search ............... 374/181, 182, 168, 112; 136/230

[56] References Cited

U.S. PATENT DOCUMENTS

| | | | |
|---|---|---|---|
| 3,680,384 | 8/1972 | Grindheim | 374/112 |
| 3,916,691 | 11/1975 | Hollander et al. | 374/181 |
| 3,935,744 | 2/1976 | Beckman | 374/181 |
| 4,130,019 | 12/1978 | Nitschke | 374/181 |
| 4,133,700 | 1/1979 | Hollander et al. | 374/181 |
| 4,157,663 | 6/1979 | Ihlenfeldt et al. | 374/181 |
| 4,482,261 | 11/1984 | Dewey et al. | 374/181 |

OTHER PUBLICATIONS

Publication—"Model 444 Alphaline ®Temperature Transmitters and Assemblies", Rosemont, Inc. 1977—(5 pages)—brochure.

*Primary Examiner*—Daniel M. Yasich
*Attorney, Agent, or Firm*—Kinney & Lange

[57] ABSTRACT

A cold junction compensation bridge for a thermocouple circuit includes a temperature compensation resistor encased in a heat conductive material and is directly connected to the same terminal block or strip to which the thermocouple leads are attached. The compensation resistor is in the same chamber of a housing as the cold junction of the thermocouple so it is subjected to the same temperature as the thermocouple junction. This is of particular importance in two wire current transmitters wherein the housings are multi compartment, with the electronics in one compartment (that may be sealed and not normally opened) and the terminal blocks for connecting the thermocouple and the like, as well as the calibrating screws, in a separate compartment. In such arrangements the thermocouple cold junction can be at a different temperature than the rest of the electronics. In the present invention, the cold junction compensation resistor is in the same location as the junctions of the thermocouple to insure that any changes in temperature of the cold junction are sensed by the resistor.

9 Claims, 5 Drawing Figures

COLD JUNCTION COMPENSATION FOR THERMOCOUPLE

BACKGROUND OF THE INVENTION

1. Field of the Invention

The present invention relates to improving the accuracy and reliability of cold junction compensation for a thermocouple by mounting a cold junction compensation resistor in the same environment as the cold junction of the thermocouple.

2. Description of the Prior Art

A typical application of thermocouple use with a two wire current transmitter for example is shown in U.S. Pat. No. 3,680,384, issued to Grindheim. In FIG. 5 of this patent, a thermocouple circuit is illustrated, and cold junction compensation is provided.

Commercial embodiments of two wire thermocouple input two wire current transmitters have been sold by Rosemount Inc. of Eden Prairie, Minn. as their Models 441, 442, and 444 Two Wire Transmitters. A typical arrangement is shown in a 1978 product bulletin on the Model 444 product data sheet 2263. This bulletin illustrates the two wire circuit used with the thermocouple.

The two wire transmitter housing that is used with these devices has two compartments that are separated by a divider wall, with only the leads to the electronics passing through the wall. One of the compartments contains the electronics needed including the entire cold junction compensation bridge, and the other compartment houses the terminal strip and zero and span adjustment screws. The terminal strip or block in the second compartment of the two wire transmitter housing is readily accessible to the exterior by removing a cover. The terminals for connecting the thermocouple are on the terminal block, as well as the test and input power terminals.

In the devices sold to date, the cold junction compensation resistor, which is normally needed for thermocouples, and is shown in U.S. Pat. No. 3,680,384 schematically as R4, has been mounted with the rest of the cold junction compensation bridge resistors on the circuit boards, in the housing compartment separated from the terminal block. This arrangement has been used for years, without realizing that errors could be calibrated into the circuitry because of temperature differences in the two chambers during calibration when the access cover to the terminal block and zero and span adjustments were removed.

The cold junction temperature compensation resistor is generally a nickel wire wound resistor whose resistance increases with temperature, just as a thermocouple voltage does, and thus the compensation signal is dependent upon the temperature of the cold junction compensation resistor. It is generally desired that the temperature of the cold junction of the thermocouple and the temperature of the compensation resistor remain the same, so that the cold junction temperature does not affect the output of the bridge network or transmitter.

When the dual compartment housing is used, with the cold junction compensation resistor in the electronics compartment, the terminal block side of the housing may be shocked by a sudden change in temperature which is not transferred to the electronics compartment of the housing quickly enough to change the resistance of the cold junction compensation resistor during the calibration process, for example. Errors will occur unless the temperature of the compensation resistor matches that of the cold junction of the thermocouple.

In the present transmitters the sudden temperature changes most often occur during calibration of the transmitter since that is the most likely cause for removing the cover from the terminal block side of the housing. Thus, if the transmitter is being calibrated during a temperature gradient, an error is calibrated into the transmitter in the conventional arrangement when the cold junction compensation resistor is with the electronics in a different compartment from the terminal block and calibration adjustments. Such error would then be continuous until such time as the transmitter is recalibrated, which generally would not be very often.

SUMMARY OF THE INVENTION

The present invention relates to a way of reducing or eliminating the errors due to temperature differences between the temperature of the cold junction of a thermocouple, and the temperature of a cold junction compensation resistor used in the circuit. In particular, the invention relates to the mounting of the cold junction compensation resistor, for example a nickel wire wound resistor, in the same housing compartment as the terminals for connecting the thermocouple. The cold junction compensation resistor is mounted in a block of material that is sufficiently inert to be capable of withstanding hostile atmospheres, has good temperature conducting properties, and is able to withstand normal handling. The cold junction compensation resistor is connected to end tabs of conducting material which are in contact with the block of material encapsulating the compensation resistor and which also attach to terminal screws on the terminal block used for attaching the thermocouple to provide for conduction of heat to the block of material and the compensation resistor. The tabs are formed so that they can be mounted on two screw terminals of a terminal block of a two wire transmitter (one being the same screw as the negative terminal of the thermocouple). Thus the cold junction of the thermocouple is closely adjacent to the cold junction compensation resistor so that the enviroment that affects the thermocouple cold junction also directly and immediately affects the cold junction compensation resistor so that proper compensation is obtained. Further, during calibration no errors are calibrated into the system.

DETAILED DESCRIPTION OF THE PREFERRED EMBODIMENT

Figure 3:
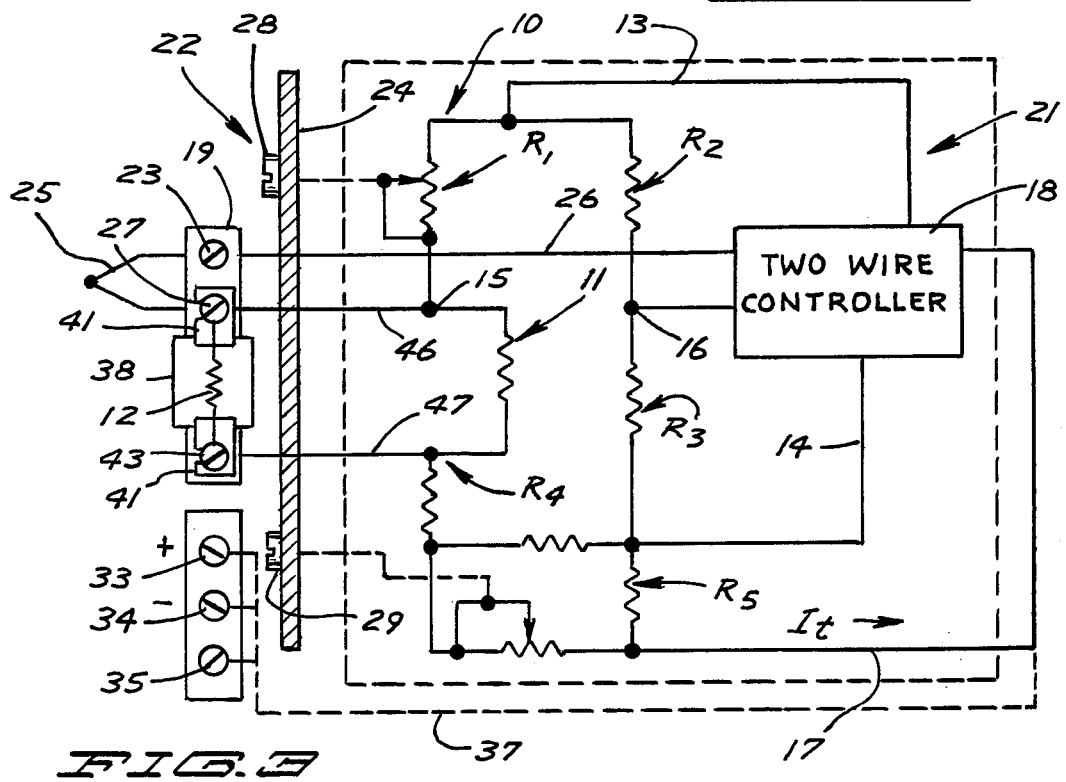
FIG. 3 is a simplified schematic representation of a typical input circuit and cold junction compensation resistor mounting.
Figure 4:
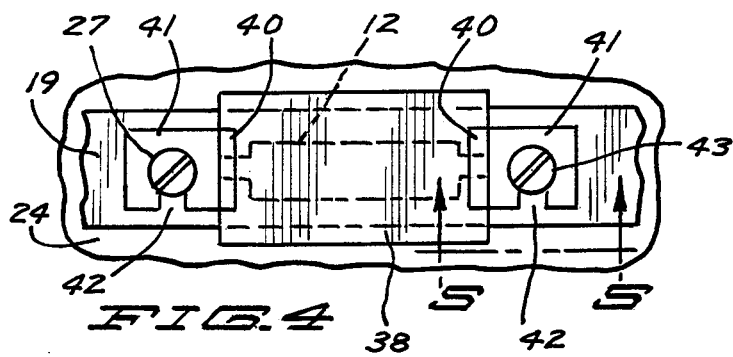
FIG. 4 is a top plan view of a cold junction resistor mounted according to the present invention.
Figure 5:
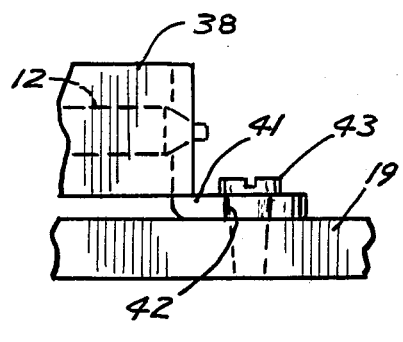
FIG. 5 is a fragmentary elevational view taken on line 5—5 in FIG. 4.

As shown in FIG. 3 schematically, a thermocouple output circuit 10 includes a cold junction compensation bridge including resistors R1, R2, and R3, which form three legs of a bridge. The fourth leg is formed, as shown, with a cold junction compensation resistor network indicated generally at 11, and which together with a cold junction wire wound resistor 12 provide a resistance R4. A feedback resistance arrangement R5 is provided as shown schematically and this includes a suitable span adjustment resistor made part of the feedback resistance arrangement. Bridge power is supplied on lines indicated at 13 and 14, and the bridge output terminals are indicated at 15 and 16. The bridge exitation or power is provided by a conventional two wire current controller 18.

A thermocouple 25 has its negative lead connected to a terminal screw 27 on a terminal block 19. Terminal 27 is connected to bridge terminal 15. The positive lead of thermocouple 25 is connected to a terminal 23 and then with a connecting line 26 to one input of the two wire controller 18. The other input of the two wire controller 18 is connected to bridge terminal 16. The two wire controller 18 is a standard controller which provides an output current proportional to the signal at its input and thus the total current $I_t$ on line 17 will be fed through the feedback resistance and will be proportional to the signal from the thermocouple 25. This is a standard electrical arrangement.

Figure 1:
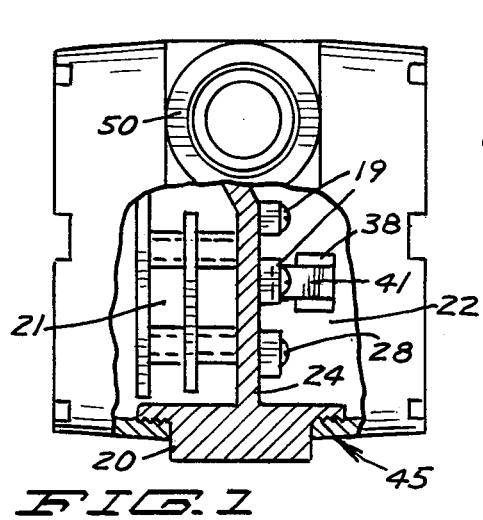
FIG. 1 is a side view of a two wire current transmitter housing for use with a thermocouple input with parts broken away to show the mounting of a cold junction compensation resistor made according to the present invention.
Figure 2:
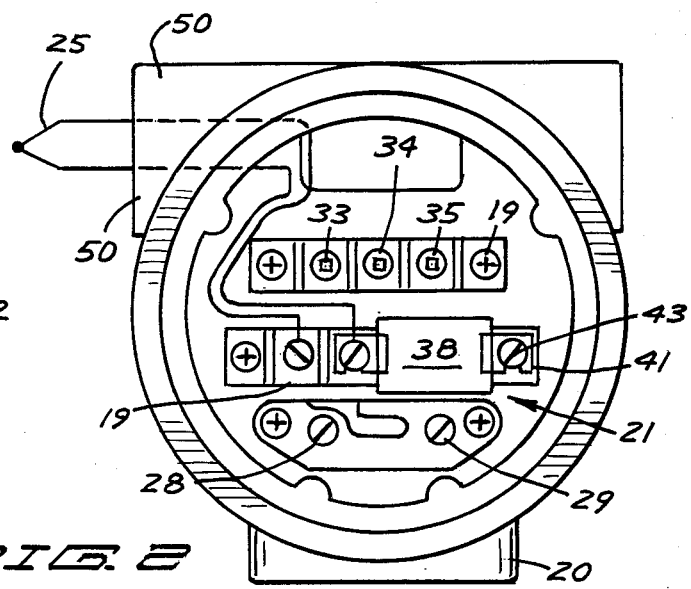
FIG. 2 is an end view of the device of FIG. 1 with an access cover removed.

As shown in FIGS. 1 and 2 and schematically in FIG. 3, a standard two wire transmitter housing indicated generally at 20 is made with two compartments, including a first compartment 21 in which the circuit boards for the necessary circuitry for the two wire controller are mounted. A second compartment indicated at 22 contains two terminal blocks 19 having screw terminals for connecting various components in place as mentioned. A divider wall 24 is provided between the compartments, and the connecting wires such as line 26, pass through this barrier wall in a sealed relationship, and attach to the respective terminals on terminal blocks 19.

Each of the terminal blocks 19 mounted on wall 24 has a plurality of terminal screws. Also, compartment 22 contains the heads of a "zero" adjustment screw 28 and a span adjustment screw 29, which are connected through the wall 24 to adjustable resistor $R_1$ for zero adjust and to the span potentiometer forming part of feedback resistor $R_5$.

In this form of the invention, the terminal blocks 19 include terminal screws 34 and 35 for connection of a DC line for powering the two wire controller through a DC source and load as is well known, and as is shown in U.S. Pat. No. 3,680,384. A test terminal 33 is provided. The DC line 37 is for powering the circuit and for carrying the total current $I_t$, which represents the temperature sensed by the thermocouple.

In the prior art, the cold junction compensation resistor forming part of the cold junction compensation bridge was located in compartment 21 with the rest of the circuitry. In the present invention, the cold junction compensation resistor 12 is mounted in the chamber 22, and has leads connected to terminals on a terminal block 19. As shown, the wire wound resistor 12 is mounted in a block of heat conducting material indicated at 38, for example, and has output lead tabs 40 electrically connected to the resistor 12. The tabs 40 are embedded in the block 38 and fixed thereto at opposite ends of the block. The tabs 40 are electrically conductive, and also heat conductive metal and have mounting ears 41,41 at opposite ends of the block 38. The ears 41 have slots 42, as shown, which are open to receive terminal screws 27 and 43, respectively that are in turn screwed into terminal block 19. The screw 27 is also used for connecting the negative lead of thermocouple 25 to terminal 15 of the bridge. The terminal screw 27 is connected with a wire 46 to bridge terminal 15, and terminal screw 43 is connected to a wire 47 which in turn connects the resistor 12 into the bridge 10 to form the bridge resistor R4.

The material forming the block 38 can be of any heat conductive material, suitably moldable for protecting the resistor 12 from hostile environments that may be present or capable of entering the chamber 22.

A housing service cover 45, is removable (by unscrewing it) for calibration or other service. Screws 28 and 29 for zero and span adjustment, respectively, are then accessible. Any substantial temperature difference of the surrounding air from the environment in which the instrument has been operating will affect the resistance 12, which is the cold junction compensation resistor, in the same manner that it will the cold junctions of the thermocouple 25. The thermocouple 25 is connected to the same terminal block 19 in chamber 22 as the mounting resistor 12, and one terminal screw is the same as that used for a lead of the thermocouple.

The spacing of the grooves 42 can be made to fit on the terminal block used. The block 38 resists mechanical damage and the metal tabs 40 and ears 41 securely hold the block 38 in position. The connections are easily made and the mounting solves a problem that had remained unresolved for years. The leads for the thermocouple, and for the remote power and the like, can be passed through a suitable connector indicated generally at 50 of conventional design. The junctions for the thermocouple are present at a terminal block in the same region as the cold junction compensation resistor. The block 38 material may be made of ultra-high molecular weight polyethylene such as Perma-Poly brand material available from Seelye Plastics Inc. of Minneapolis, Minn.

The positioning of wirewound resistor 12 in the block of heat conducting material 38 slows the response of the temperature of resistor 12 to changes of the temperature in compartment 22. The thermal response of resistor 12 is thus substantially matched to the thermal response of the cold junction formed at terminal block 19. During sudden changes in the temperature in the compartment 22, the temperatures of the resistor 12 and the cold junction are closely matched to reduce transient errors at the output.

Although the present invention has been described with reference to preferred embodiments, workers skilled in the art will recognize that changes may be made in form and detail without departing from the spirit and scope of the invention.

What is claimed is:

1. In a two wire transmitter having a thermocouple input, and resistance means for cold junction compensation thereof, said two wire transmitter having a transmitter housing with two compartments, a first of said compartments mounting electronic components, and a second of said compartments housing terminal block means having a thermally responsive cold junction terminal for connection of a lead of a thermocouple, the improvement comprising:

a cold junction compensation means forming part of the resistance means and having a thermal response substantially matched to the thermal response of the cold junction terminal, a resistor of said resistance means mounted on a block of heat conductive material, said block of heat conductive material being located in said second compartment, and means for mounting the cold junction compensation means in the second compartment and electrically connecting said resistor means to the rest of the resistance means in the first compartment of the housing.

2. The apparatus of claim 1 having said block of heat conducting material mounted on the cold junction compensation means for slowing the response of the cold junction compensation means to temperature changes in the second compartment.

3. The apparatus of claim 2 including connection tabs at opposite ends of said block of heat conducting material, said connection tabs having slots for connection to screws on said terminal block means.

4. The apparatus as specified in claim 3 wherein said tabs are made of metal and are molded to the block of material and electrically connected to opposite ends of said cold junction compensation means.

5. The apparatus as specified in claim 1 wherein said resistor of said cold junction compensation means has metal connection tabs at its ends in heat conducting relationship with the cold junction compensation means, said tabs having ears at outer ends thereof which fit onto terminal screws of said terminal block means.

6. The apparatus of claim 5 wherein the cold junction compensation means is mounted in the housing on terminal screws, one of the terminal screws mounting said tabs comprising a terminal screw for connecting one lead from a thermocouple used with the two wire transmitter.

7. The apparatus as specified in claim 1 wherein said first compartment is substantially sealed from said second compartment, and the only electronic component in said second compartment comprises said cold junction compensation means.

8. The apparatus of claim 7 wherein the electronic components in the first compartment include at least one adjustable component for calibration purposes, said adjustable component having a manual adjustment element in the second compartment movable for calibrating the transmitter.

9. The apparatus as specified in claim 1 wherein said cold junction compensation means is mounted in a block of material comprising polyethylene.

* * * * *